United States Patent Office 3,498,876
Patented Mar. 3, 1970

3,498,876
LOW EXPANSION COPPER-ZINC-ALUMINOSILICATE GLASS COMPOSITIONS, COMPOSITE ARTICLE AND MIRROR
Nils Tryggve E. A. Baak, Ridgefield, Conn., and Charles F. Rapp, Toledo, Ohio, assignors to Owens-Illinois, Inc., a corporation of Ohio
No Drawing. Filed Dec. 29, 1966, Ser. No. 605,585
Int. Cl. B32b 17/06
U.S. Cl. 161—193     14 Claims

ABSTRACT OF THE DISCLOSURE

Copper-zinc aluminosilicate glasses and/or glass compositions are disclosed which consist essentially of from 50–94 mole percent $SiO_2$, 0.5–30 mole percent $Al_2O_3$, 1.5–35 total mole percent of $Cu_2O$ and $CuO$, and 0.5–20 mole percent $ZnO$. Such glasses and/or glass compositions generally exhibit coefficients of thermal expansion which are not greater than $15 \times 10^{-7}$ °C. over the temperature range of 0° C.–300° C. and are especially suitable as sealing glass compositions for sealing with low thermal expansion materials such as fused quartz and fused silica as well as being extremely useful for forming shaped low expansion bodies such as astronomical mirrors and the like.

---

The present invention relates to novel compositions of matter, and more particularly, the instant invention pertains to glass compositions having a low thermal coefficient of expansion and other desirable properties.

In the fields of commerce and science, glass compositions possessing low expansion properties are required for many endeavors. For example, low expansion glasses can be used as sealing glasses for sealing fused quartz to fused quartz, fused quartz to low expansion glass ceramics, low expansion glass ceramics to low expansion glass ceramics, fused silica to fused silica and the like. Low expansion glasses are also used for the fabrication of mirrors in optical instruments which require precise dimensions; hence glasses which appreciably change in dimensions are accordingly unsuited for said purposes.

It will be appreciated by those versed in the subject art that if novel glass compositions are compounded that possess characteristics suitable for the employment of the endeavors supra, such glass compositions would represent a useful contribution to the art. Likewise, it will be further appreciated by those skilled in the art that if unobvious glasses are synthesized so as to possess a highly desirable low coefficient expansion and other desirable properties, said glasses would have a definite commercial value and a positive use for industry and science.

Accordingly, it is an object of the present invention to provide novel glass compositions for use in the fields of commerce and science.

It is a further object of the instant invention to provide unique glasses possessing desirable properties and characteristics.

Still a further object of this invention is to provide glass compositions possessing a low coefficient of thermal expansion.

It is still a further object of the present invention to provide alkali-free copper-zinc aluminosilicate glass compositions.

Yet a further object of the present invention is to provide copper-zinc-alumina-silicate glasses having a low thermal coefficient of expansion.

Yet still a further object of this invention is to provide glass compositions containing copper and zinc that possess a relatively low density and other desired properties.

It is still a further object of the instant invention to effect copper-zinc aluminosilicate glasses that have good resistance to thermal shock and are therefore suitable for the fabrication of optical devices.

It is still a further object of the present invention to provide articles of manufacture fabricated from the instant novel and unobvious glass compositions.

It is still a further object of the present invention to provide copper glasses at a lower cost by the incorporation of bivalent zinc cations into said copper glasses, and also to reduce the tendency toward oxidation by the introduction of said bivalent zinc.

These and other objects and advantages of the instant invention will become apparent to those skilled in the art from the following detailed description and the accompanying claims.

In attaining the above objects and advantages of this invention, it has now been found that the instant inventive glasses possess low expansion and other properties and are therefore, extremely advantageous and desirable for those endeavors requiring said characteristics. The glasses of the subject invention are based on an essentially alkali-free cuprous oxide-cupric oxide-zinc oxide-alumina-silica, $Cu_2O$-$CuO$-$ZnO$-$Al_2O_3$-$SiO_2$, system. Copper oxide is generally considered to be thermally unstable so that at very high temperatures it can give up its oxygen to form metallic copper. At very high temperatures, an equilibrium between cuprous ion and copper metal is favored, while lower temperatures favor the equilibrium between cuprous and cupric ions. The inversion temperature, at which the shift in equilibrium towards the lower valence states of copper generally occurs is at about 1600° C. or in the normal melting range for the subject copper glasses. Thus, a substantial amount of copper in the instant system is in the cuprous state. Preferably, a predominant amount, that is, at least 50 mole percent of the copper is in the cuprous state. Therefore, the present system is conveniently referred to as $SiO_2$-$Al_2O_3$-$Cu_2O$-$ZnO$ in which $Cu_2O$ means either cuprous oxide, cupric oxide or both.

The inventive addition of the bivalent zinc cation to an essentially alkali-free cupric-cuprous-alumina-silica system is seen to afford unobvious advantages. The zinc cation not only lowers the cost of manufacturing the subject glasses, as it has now been found that it can be substituted for part of the total concentration of the more expensive copper in the base system and still unexpectedly maintain low expansion characteristics, but it also reduces the tendency towards oxidation of the cuprous oxide to cupric oxide on the surface of the instant glasses due to the effects of the atmosphere during melting, sealing, article fabrication and the like. Another advantage obtained by the addition of zinc oxide to the copper base glasses is a lighter colored glass as a resultant of the decreased copper concentration. Generally, a copper system which is free of zinc is usually dark green, reddish brown or black depending on the concentration of the copper and thickness of the glass. The present system, by virtue of containing zinc, is somewhat lighter in like colors and accordingly will be apparently less light absorbing in the manufacture of cuvettes and the like.

The subject glasses are generally based on a compositional range consisting essentially of 50 to 94 mole percent silica, 0.5 to 30 mole percent alumina, 1.5 to 35 mole percent copper oxide and 0.5 to 20 mole percent zinc oxide. Usually, the glasses can be made over the range of from 58 to 85 mole percent silica, 2 to 15 mole percent alumina, 2 to 15 mole percent copper oxide and about 1 to 10 mole percent zinc oxide. The glasses of the invention generally have an expansion of about $15 \times 10^{-7}$, with the now preferred expansion being not more than $10 \times 10^{-7}$ or less.

Exemplary of presently preferred glass compositions are a glass consisting essentially of 72 to 85 mole percent $SiO_2$, 2 to 15 mole percent $Al_2O_3$, 2 to 15 mole percent $Cu_2O$ and from 1 to 10 mole percent ZnO; a glass consisting of 72 to 85 mole percent $SiO_2$, 2.5 to 12.5 mole percent $Al_2O_3$, 2.5 to 12.5 mole percent $Cu_2O$ and 1 to 9 mole percent ZnO; a glass composition consisting essentially of 70 to 80 mole percent $SiO_2$, 5 to 12.5 mole percent $Al_2O_3$, 5 to 12.5 mole percent $Cu_2O$ and 3 to 8 mole percent ZnO. Exemplary of specific glass compositions based on the present silica-alumina-copper-zinc system are a glass composition consisting essentially of 75 mole percent $SiO_2$, 12.5 mole percent $Al_2O_3$, 7.5 mole percent $Cu_2O$ and 5.0 mole percent ZnO; and, a glass composition consisting essentially of 77.5 mole percent $SiO_2$, 10 mole percent $Al_2O_3$, 6.5 mole percent $Cu_2O$ and 6 mole percent ZnO.

In preparing the glasses of the present invention, the desired batch ingredients are well mixed, either manually or mechanically, melted and heated to temperatures such that all substances are present in a liquid state, thereby enabling the formation of a glass from a homogeneous melt.

The various ingredients employed to fabricate the glasses of the subject invention can be in the form of oxides, carbonates, fluorides, silicates, or any other form which does not disturb or adversely affect the desired glass compositions. The batch materials employed for preparing the subject glasses were of high purity, commercially available materials and were selected from the following: Kona Quintus Quartz $SiO_2$, Alcoa A–14 Alumina $Al_2O_3$, cuprous oxide $Cu_2O$, cupric oxide CuO, zinc oxide ZnO, Clumet Hi-Cupric (a commercially available copper mixture of 30% $Cu_2O$ and 66.8% CuO), and the like.

In the preparation of the novel glasses of the subject invention, as disclosed and claimed herein, the batch ingredients were intimately mixed by hand or in a commercially available V-Blender to obtain a homogeneous mixture. Any suitable mixing means and heating means, gas or electric, can be employed to obtain the desired melt. The glasses prepared were melted in a 90% platinum–10% rhodium crucible or in a Lavasil fused silica crucible. In the examples reported hereinafter, the size of the melts varied and generally included samples of 100 grams and about 5000 grams. The melting was carried out in electric furnaces wherein the melting temperatures were in most in the range of about 1500° C. (about 2700° F.) to about 1650° C. (about 3000° F.). It was observed that from about 16 hours to about 24 hours was generally sufficient for the duration of the melting to obtain a satisfactory glass. For the thermal expansion test, rods were drawn from the melts. To produce the rods, a silica or mullite rod was dipped into the molten glass for the start of the rod pulling. In conducting the thermal expansion tests for accumulation of the reported data, conventional dilatometric method was used (0–300° C.) on samples about four inches long.

Examples of batches employed to produce the subject glasses, according to the mode and manner of the present invention, and the theoretical compositional data for said batches are set forth in the examples immediately below. These examples are representative of embodiments of glass compositions of the present invention and these examples are not to be construed as limiting, as these and other obvious embodiments will be readily apparent to those versed in the art from the accompanying disclosure and claims.

EXAMPLE 1

A novel glass composition prepared according to the spirit of the present invention and having a theoretical oxide composition of 75 mole percent $SiO_2$, 12.5 mole percent $Al_2O_3$, 7.5 mole percent $Cu_2O$ and 5.0 mole percent ZnO, was prepared by intimately blending 62.07 grams of $SiO_2$, 17.55 grams of $Al_2O_3$, 14.78 grams of $Cu_2O$ and 5.60 grams of ZnO. The substantially homogeneous mixture was melted in an electrically heated furnace in a 90% platinum-10% rhodium crucible. The melting and fining procedures were conducted by heating at about 1600° C. (2912° F.), for about 16 hours. Thereafter, the glass was formed and prepared in a conventional manner.

EXAMPLE 2

A glass composition of the present invention having a theoretical composition of 77.5 mole percent $SiO_2$, 10 mole percent $Al_2O_3$, 6.5 mole percent $Cu_2O$ and 6 mole percent ZnO was prepared by intimately blending 3283 grams of Kona Quintus Quartz, 720.6 of Alcoa A–14 alumina, 680.7 grams of cuprous oxide and 344 grams of zinc oxide, to produce an essentially homogenous batch. After mixing, the batch was melted and fined at 2950° F. (about 1621° C.) for 24 hours in a 1% $O_2$ atmosphere. Cane sampels were made and the glass was poured and fritted in the conventional manner.

EXAMPLE 3

The glass of example 2, consisting of 77.5 mole percent $SiO_2$, 10 mole percent $Al_2O_3$, 6.5 mole percent $Cu_2O$ and 6.0 mole percent ZnO was subjected to conventional physical analysis and the analyzed glass composition exhibited an unannealed density of 2.6072, an annealing point of 690° C., a strain point of 632° C. and a coefficient of thermal expansion of $4.8 \times 10^{-7}/°$ C. (0–300° C.).

A zinc free glass was prepared for comparative purposes and it consisted of 77.5 mole percent $SiO_2$, 10.0 mole percent $Al_2O_3$ and 12.5 mole percent $Cu_2O$. This glass exhibited an annealing point of 629° C., a density of 1.7232 and a linear coefficient of thermal expansion of $3.2 \times 10^{-7}/°$ C. (0–300° C.).

The data presented supra is seen to indicate that zinc can be added to a copper base glass system to produce a zinc-copper glass system which has an unexpectedly lower density than the corresponding zinc-free glass, in addition to the unobvious advantages mentioned supra, without adversely affecting the desirable low expansion property. This unexpected lower density can be significant in the use of large optical components; for example, mirrors wherein the usual supporting heavy structures can now be fabricated of a reduced design.

The novel compositions of the subject invention, when used as sealing glasses for intimately joining preformed, low expansion parts can be conveniently employed by techniques well-known to the subject art. These techniques include both the cold and hot application methods. When the cold technique is used, the inventive sealing glass is mixed with a vehicle to form a paste. One acceptable vehicle is composed of about 1 to 2 percent by weight of nitrocellulose solution in amyl acetate; of course, other acceptable organic binders or vehicles may be employed provided they readily burn off and vaporize during the heating procedure of the sealing of the desired preformed parts. Examplary of other organic binders that can be used include gelatine dissolved in water, nitrocellulose and butylacetate, camphor with cellulose and the like.

When the subject compositions are utilized as solder glasses mixed with a vehicle, the solder glass vehicle composition can be manually or mechanically applied by using spatula, extrusion, cold dip, brush, roller coat, spray, doctor blade or any like means. In the extrusion method, a tooth paste-like tube can be used to hold and dispense a uniform layer along the sealing edge.

After coating with the sealing glass by any of the above techniques, the coated parts can be dried in an oven, by heaters or by any suitable heating procedure. The dry parts, assembled together, are next intimately sealed in an oven and then cooled to room temperature.

The solder glass, when applied by the hot method of application, is usually melted in a suitable container, such as a platinum crucible or the like. The parts being processed are preheated and dipped into the molten solder glass for about 10 to 20 seconds, withdrawn and allowed to "set" in air for about five to ten seconds. After the thus treated parts have cooled to room temperature, they are aligned for assembly and heated in an oven to cause the soft solder glass to intimately fuse to the preformed parts.

Generally, low expansion vitreous or glass-ceramic surfaces or the like can be intimately joined by applying the copper-zinc-alumina-silica glass to the joinable surfaces and then heating the assembled parts to produce the seal. Exemplary of a sealing glass is a composition consisting of 77.5 mole percent $SiO_2$, 10 mole percent $Al_2O_3$, 6.5 mole percent $Cu_2O$ and 6.0 mole percent ZnO, and characterized by an unannealed density of 2.6072, an annealing point of 690° C., a strain point of 632° C., and a coefficient of expansion of $4.8 \times 10^{-7}$/° C. (0–300° C.). The glass can be applied in bead or paste form and the sealable parts, for example fused quartz or fused silica can be sealed with a hand torch with a normal hydrogen oxygen flame or by other acceptable heating means, like infra red, electric oven and the like. After sealing, the parts are permitted to cool to room temperature.

The above discussions are merely illustrative of conventional sealing techniques, and it is to be understood that the sealing procedures are not intended to be limited to the instant disclosure, as other techniques may be successfully employed.

The glass compositions of the present invention can be employed to manufacture items of science and commerce. For example, the glasses can be used to join preformed glass-ceramic parts to manufacture glass-ceramics electric switches, to join preformed fused quartz parts and the like. The glasses can also be used to fabricate mirrors in telescopes and other optical systems.

What we claim is:

1. A low-expansion glass composition wherein said glass consists essentially of 50 to 94 mole percent $SiO_2$, 0.5 to 30 mole percent $Al_2O_3$, 1.5 to 35 mole percent $Cu_2O+CuO$ and 0.5 to 20 mole percent ZnO.

2. A glass composition according to claim 1 wherein said glass has a coefficient of linear expansion of not more than about $15 \times 10^{-7}$ per ° C. (0–300 C.).

3. A glass composition according to claim 1 wherein said glass consists essentially of 58 to 85 mole percent $SiO_2$, 2 to 15 mole percent $Al_2O_3$, 2 to 15 mole percent $Cu_2O+CuO$ and 1 to 10 mole percent ZnO.

4. A glass composition according to claim 1 wherein said glass has a coefficient of linear expansion of not more than $10 \times 10^{-7}$ per ° C. (0–300° C.).

5. A glass composition according to claim 3 wherein said glass consists essentially of 72 to 85 mole percent $SiO_2$, 2 to 15 mole percent $Al_2O_3$, 2 to 15 mole percent $Cu_2O+CuO$ and 1 to 10 mole percent ZnO.

6. A glass composition according to claim 3 wherein said glass consists essentially of 72 to 85 mole percent $SiO_2$, 2.5 to 12.5 mole percent $Al_2O_3$, 2.5 to 12.5 mole percent $Cu_2O+CuO$ and 1 to 9 mole percent ZnO.

7. A glass composition according to claim 1 wherein said glass consists essentially of 70 to 80 mole percent $SiO_2$, 0.5 to 30 mole percent $Al_2O_3$, 5 to 12.5 mole percent $Cu_2O+CuO$ and 3 to 8 mole percent ZnO.

8. A glass composition according to claim 1 wherein said glass consists essentially of 75 mole percent $SiO_2$, 12.5 mole percent $Al_2O_3$, 7.5 mole percent $Cu_2O+CuO$ and 5 mole percent ZnO.

9. A glass composition according to claim 1 wherein said glass consists essentially of 77.5 mole percent $SiO_2$, 10 mole percent $Al_2O_3$, 6.5 mole percent $Cu_2O+CuO$ and 6 mole percent ZnO.

10. A composite article comprising at least two surfaces intimately bonded together by an intermediate layer of a bonding composition, said surfaces being composed of materials having a low coefficient of expansion and selected from at least one of the group of materials consisting of fused silica and glass-ceramics, said bonding composition consisting essentially of 72 to 85 mole percent $SiO_2$, 2 to 15 mole percent $Al_2O_3$, 2 to 15 mole percent $Cu_2O+CuO$ and 1 to 10 mole percent ZnO.

11. A composite article according to claim 10 wherein said bonding composition consists essentially of 75 mole percent $SiO_2$, 12.5 mole percent $Al_2O_3$, 7.5 mole percent $Cu_2O+CuO$ and 5 mole percent ZnO.

12. A composite article according to claim 10 wherein said bonding composition consists essentially of 77.5 mole percent $SiO_2$, 10 mole percent $Al_2O_3$, 6.5 mole percent $Cu_2O$ and 6 mole percent ZnO.

13. A mirror for an astronomical observation device comprising a shaped homogeneous glass body composed essentially of oxides of copper, zinc, aluminum and silicon in the following relative range of mole percents:

| Constituent oxides: | Mole percent |
| --- | --- |
| Copper | 1.5–35 |
| Zinc | 0.5–20 |
| Aluminum | 0.5–30 |
| Silicon | 50–94 | said glass possessing a linear coefficient of expansion over the range of from 0° C. to 300° C. of not greater than about $15 \times 10^{-7}$ per ° C.

14. A relatively low expansion copper-zinc aluminosilicate sealing glass composed essentialy of oxides of copper, zinc, aluminum and silicon in the following relative ranges of mole percents:

| Constituent oxides: | Mole percent |
| --- | --- |
| Copper | 1.5–35 |
| Zinc | 0.5–20 |
| Aluminum | 0.5–30 |
| Silicon | 50–94 |

References Cited

UNITED STATES PATENTS

| 3,414,465 | 12/1968 | Baak et al. | 106—52 |
| 3,451,579 | 6/1969 | Bishop | 106—52 |
| 1,532,002 | 3/1925 | Thomson | 350—310 |
| 3,121,605 | 2/1964 | Nunn | 346—107 |
| 3,282,711 | 11/1966 | Lin | 106—39 |
| 3,294,496 | 12/1966 | Berghezan | 106—65 XR |

OTHER REFERENCES

Searle: Refractory Materials published by Charles Griffin, London (1950), pp. 184–185.

HELEN M. McCARTHY, Primary Examiner

U.S. Cl. X.R.

106—52, 48; 350—288